Jan. 26, 1943.   W. A. ANDERSON   2,309,293
ACCOUNTING MACHINE
Filed Dec. 12, 1938   7 Sheets-Sheet 1

INVENTOR
WALTER A. ANDERSON
BY
L. G. Julihn
ATTORNEY

Jan. 26, 1943.  W. A. ANDERSON  2,309,293
ACCOUNTING MACHINE
Filed Dec. 12, 1938  7 Sheets-Sheet 2

INVENTOR
WALTER A. ANDERSON
BY
L. G. Julihn
ATTORNEY

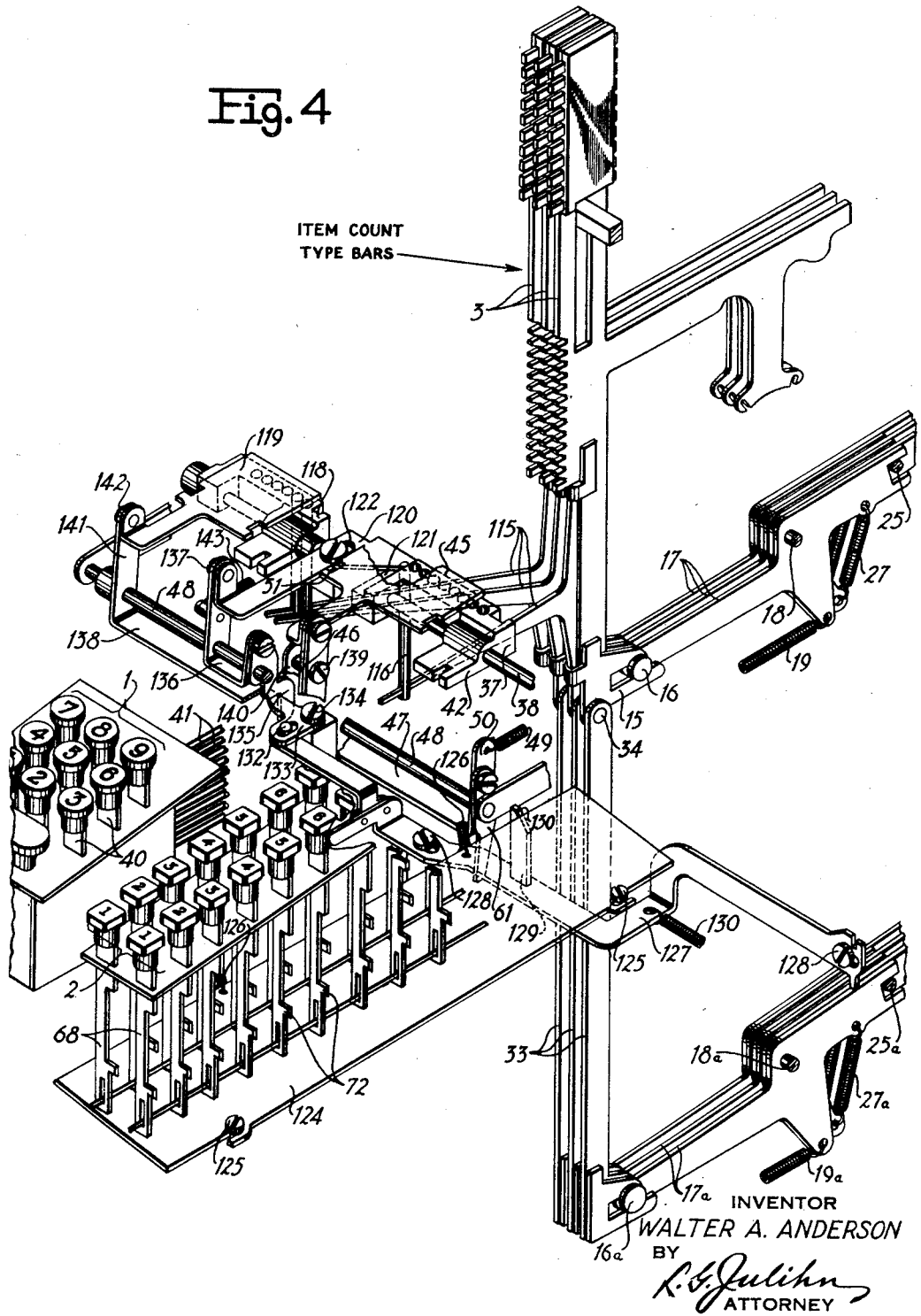

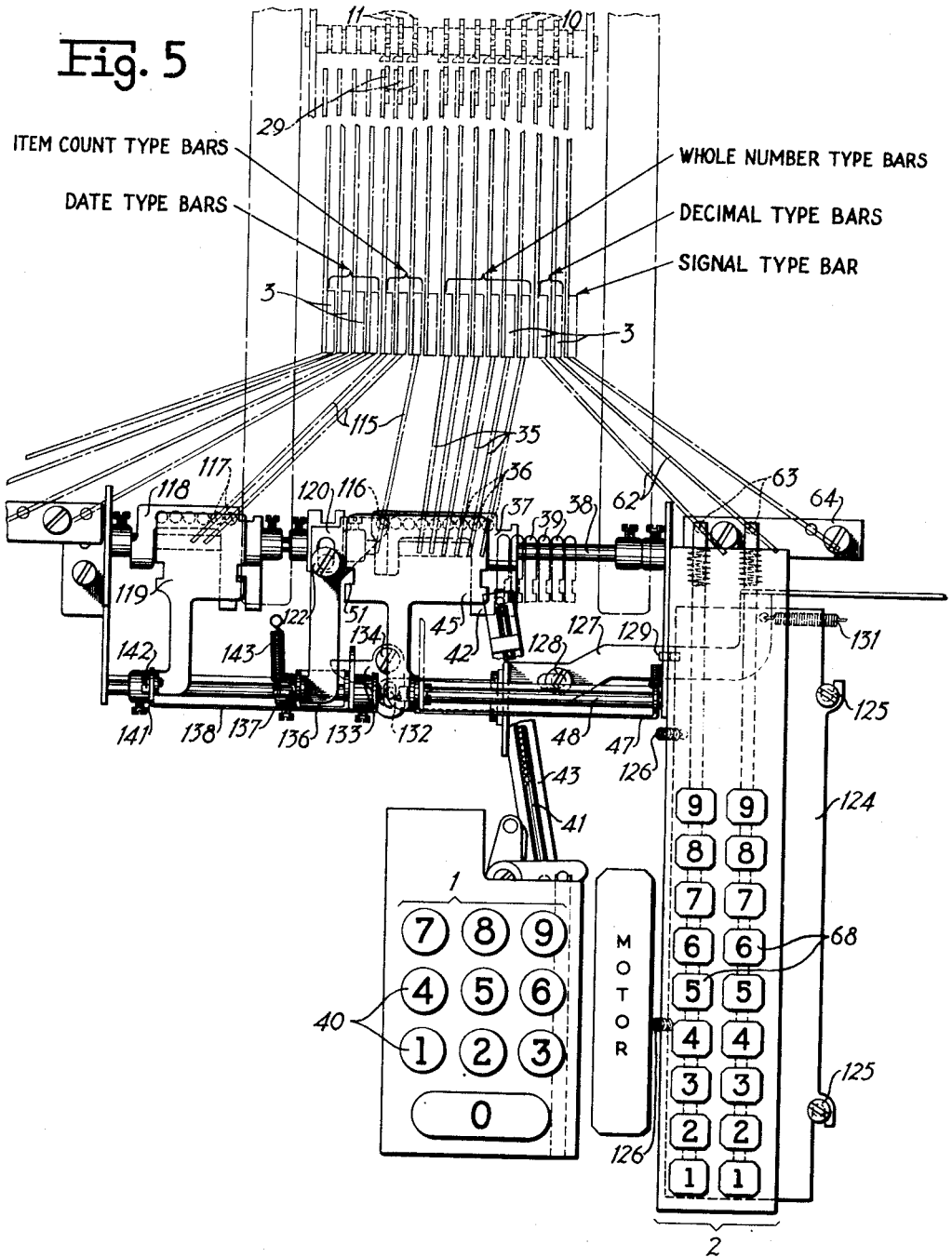

Jan. 26, 1943.                    W. A. ANDERSON                    2,309,293
                                 ACCOUNTING MACHINE
                              Filed Dec. 12, 1938            7 Sheets-Sheet 5
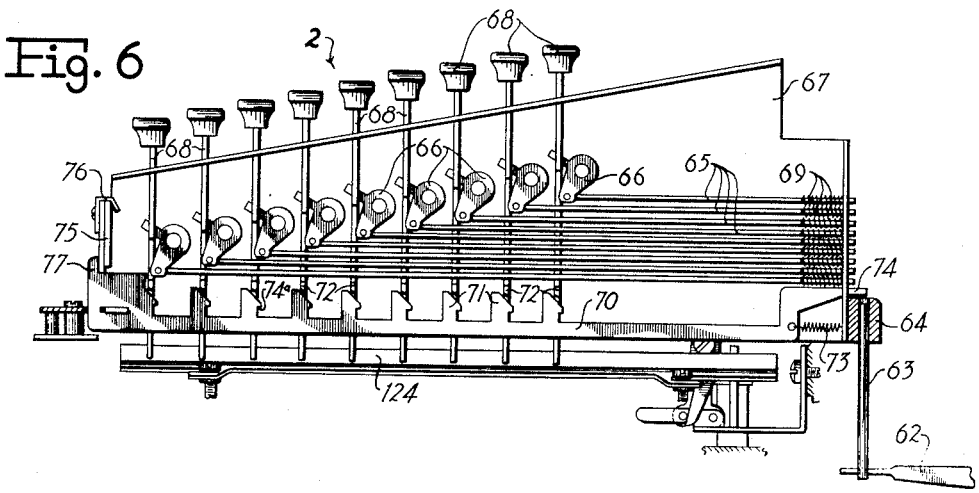
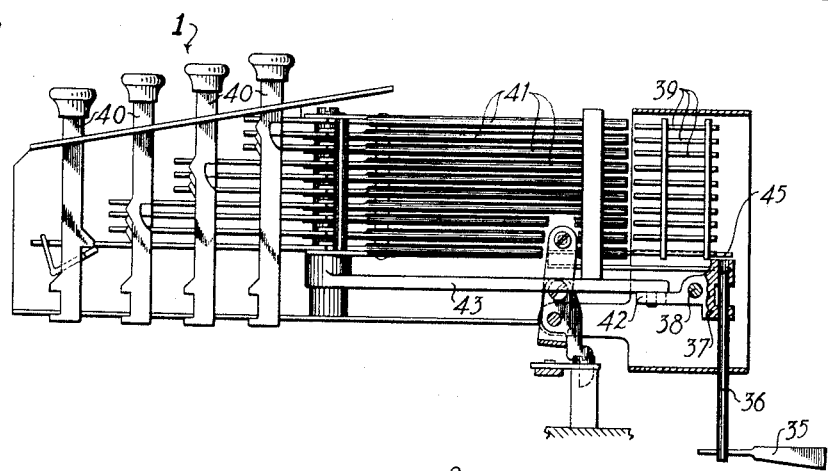
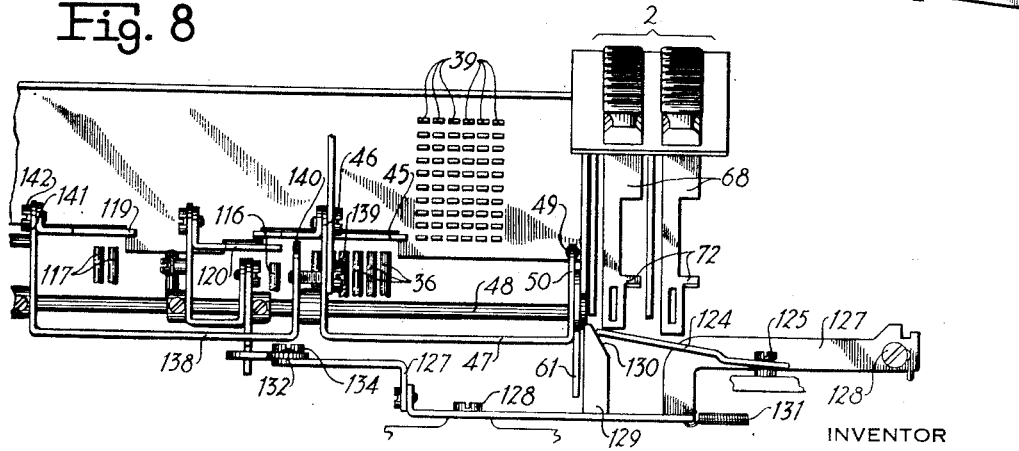
INVENTOR
WALTER A. ANDERSON
BY
L. G. Julihn
ATTORNEY

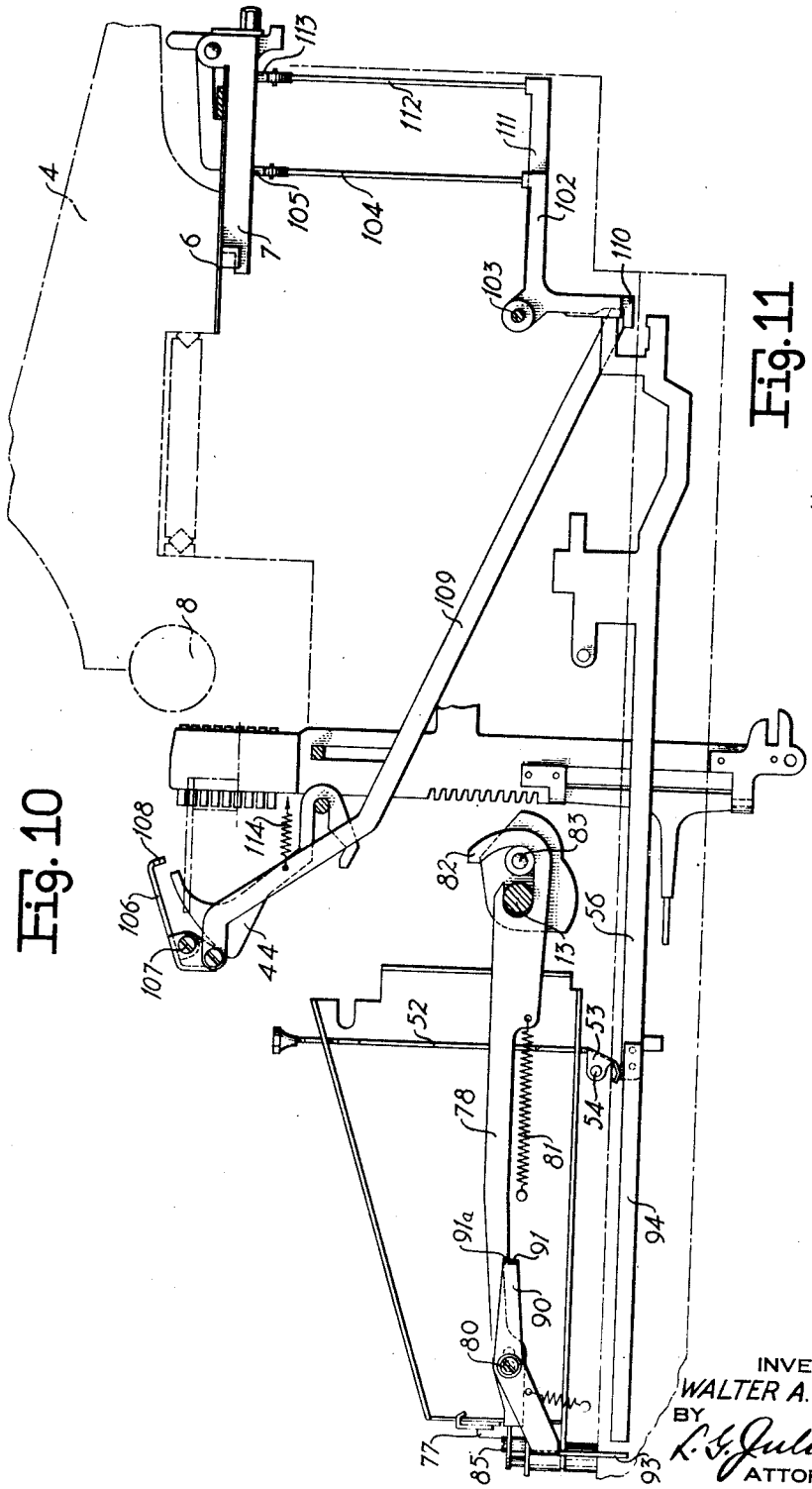

Patented Jan. 26, 1943

2,309,293

UNITED STATES PATENT OFFICE 2,309,293

ACCOUNTING MACHINE

Walter A. Anderson, Bridgeport, Conn., assignor to Underwood Elliott Fisher Company, New York, N. Y., a corporation of Delaware Application December 12, 1938, Serial No. 245,069

3 Claims. (Cl. 235—60)

This invention relates to accounting machines, and more particularly to the keyboard structures thereof and to item counting mechanism controlled thereby.

Many types of accounting work require the printing of numerous whole number amounts, i. e., amounts having no decimal fractions, interspersed with amounts involving decimal fractions. In indexing these whole number amounts on the well known 10-key type of keyboard, it is necessary to depress the zero key twice following the indexing of the amount, to allocate the digits thereof in correct decimal order (to the left of the decimal point).

It is an object of the present invention to provide a novel keyboard on which either whole number amounts or amounts involving decimal fractions may be indexed directly in correct decimal order, without it being necessary to depress the zero key following the indexing of the digits of a whole number.

Another object of the invention lies in the provision of means under the control of the amount indexing keys for counting the number of amounts entered in each of the several accumulating registers.

With these and incidental objects in view, the invention consists in certain novel features of construction and combinations of parts, the essential elements of which are set forth in appended claims, and a preferred embodiment of which is hereinafter described with reference to the drawings which accompany and form part of the specification.

In said drawings:

Figure 1 is a perspective view of an accounting machine embodying the invention, Figure 2 is a diagrammatic view of the keyboard, Figure 3 is a right side elevation showing parts of the keyboard, the adding registers, the type bars and actuating mechanism, Figure 4 is a perspective view showing the type bars for the item counters and mechanism associated with the keyboard for controlling their operation, Figure 5 is a top plan view showing the connections of all of the type bars with the keyboard, Figure 6 is a right side elevation of the decimal fraction indexing keys, Figure 7 is a right side elevation of the whole number indexing keys, Figure 8 is a front elevation of the keyboard stop section and the decimal fraction indexing keys, Figure 9 is a perspective view of the register total taking key and mechanism associated therewith for releasing the decimal fraction type bars during total taking operations, Figure 10 is a right side elevation of the parts shown in Figure 9, together with mechanism controlled by the carriage for suppressing the printing of the two zeros to the right of the decimal point when whole number amounts are printed, and Figure 11 is an illustration of printed items and totals of whole numbers and those having decimal fractions.

GENERAL DESCRIPTION

This is an improvement on the machines disclosed in the applications of Oscar J. Sundstrand, Serial Nos. 581,800 and 88,092, filed December 18, 1931 and June 30, 1936, respectively, now Patents Nos. 2,194,270 and 2,209,240, respectively. The machine is equipped with the well known 10-key amount keyboard for indexing digits to the left of the decimal point in the usual manner, the keys of which will be referred to as the whole number keys, supplemented by two rows of keys of the 81-key type of keyboard for indexing decimal fractions to the right of the decimal point, these keys being hereafter referred to as the decimal keys. It is provided with the customary date setting, totalizer and operation controlling keys. Eight adding registers are provided, four of which are located in an upper group and the other four in a lower group. All the registers are actuated by a set of actuators adjustable under control of stops set by the amount keys. The actuators also control the adjustment of type for printing amounts and totals. Each register shaft carries a series of wheels, separate from the amount accumulating wheels, which count the number of items accumulated in that register, separate transfer elements being provided for these item counting wheels.

Selection of the registers is performed by depression of one of four keys to select a particular register in the upper or lower group, and the group in which the desired register is located is selected by the depression of a fifth key.

Totals are taken from the adding registers by depressing the proper selecting keys, operating the machine through a blank cycle, then depressing the register total key and again operating the machine.

The carriage illustrated in the drawings is of the combined front and rear feed type. It is movable laterally to different columns and returned automatically from a predetermined position. The carriage includes a control plate carrying a series of magazines with control lugs for automatically controlling the numerous operations controlled manually from the keyboard.

Mechanism connected with the register total key is arranged to release the decimal fraction type bars simultaneously with the release of the whole number type bars during total taking cycles.

A non-print blank automatically controlled by the paper carriage serves to suppress the printing of ".00" by the decimal fraction type bars in columns where amounts not involving decimal fractions are printed.

DETAILED DESCRIPTION

INDEX OF TOPICS

1. The machine sections and general actuating mechanism.
2. Actuation of registers generally.
3. Amount indexing and printing by whole number keys.
4. Amount indexing and printing by decimal keys.
5. Carriage controlled means for non-printing ".00" in whole number amount columns.
6. Control of item count by whole number keys.
7. Control of item count by decimal keys.
8. Illustration of printed items and totals.

1. The machine sections and general actuating mechanism

Figure 1:
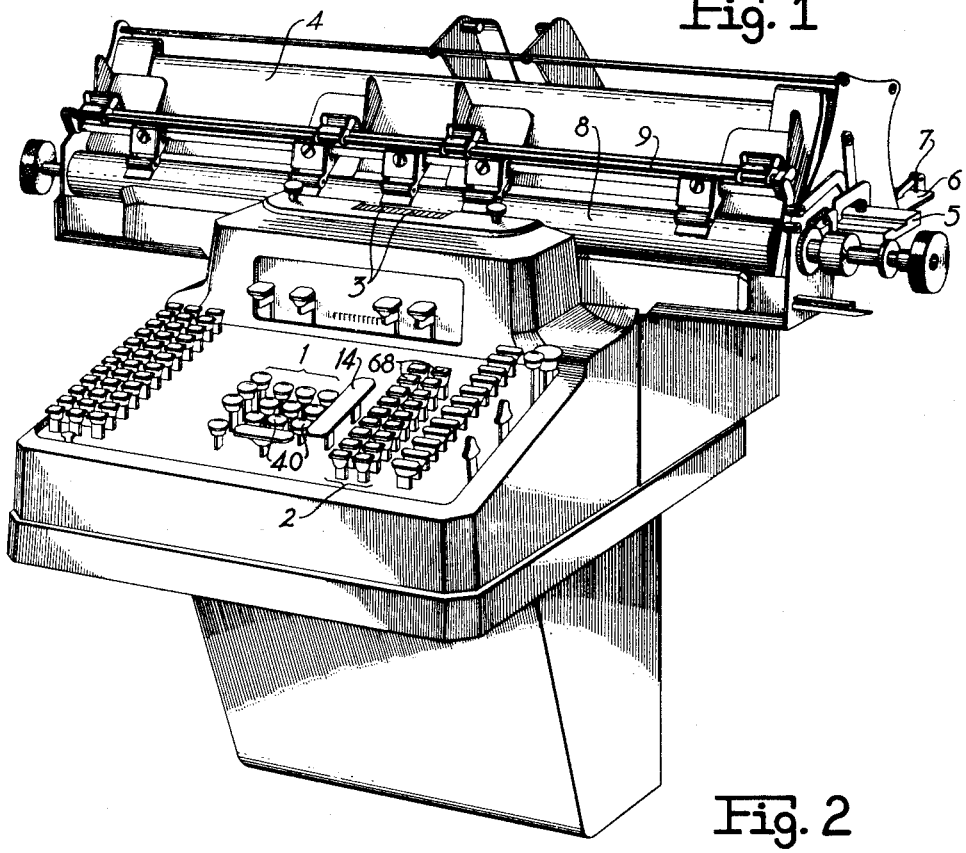
Figure 2:
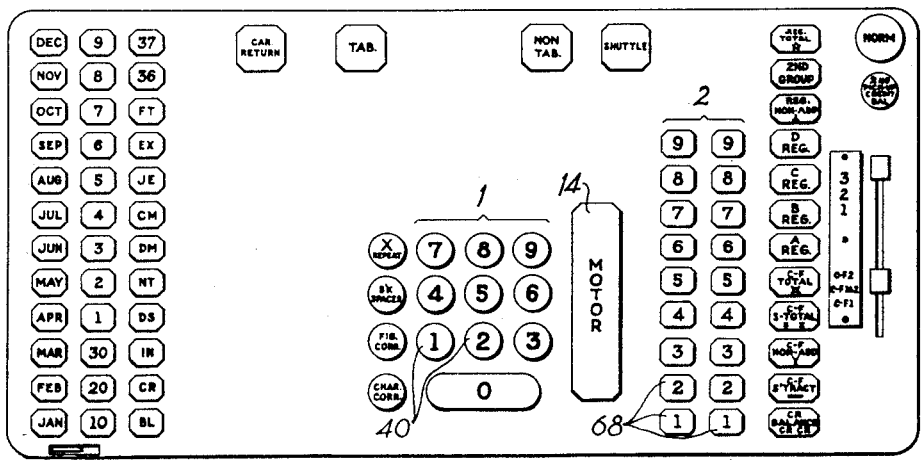

Referring to Figure 1, the machine includes whole number amount keys 1 and decimal amount keys 2, type bars 3 for printing on work sheets, a laterally movable paper carriage 4 mounted on a track 5, and a plate 6 mounted on the carriage and having a plurality of control magazines 7 for automatically controlling the operation of the machine in the several columnar positions. The carriage is provided with the customary roller platen 8 for insertion of work sheets at the rear thereof, and a bail structure 9 for use in connection with other sheets fed from in front of the platen. The machine also includes (Figure 3) eight adding registers arranged in two groups situated one above the other, there being four registers in each group. They are designated generally A, B, C and D in each group, and each includes a plurality of ten toothed wheels 10. The last three wheels at the left in each register (Figure 5) are spaced from the other wheels and are numbered 11. These wheels are used to count the items entered in their associated registers.

Manual means for controlling such functions as selection of the registers, non-addition, total taking, computing selectively in the various registers, etc., are located at the right hand side of the keyboard (Figure 1). The mechanism for performing these various operations is fully disclosed in application Serial No. 581,800.

The machine is actuated by an electric motor (not shown). The motor is started by the closing of a suitable switch mechanism and is coupled with an actuating shaft 13 by a suitable clutch mechanism upon depression of a motor bar 14 (Figure 1). The actuating shaft is connected to the motor drive in such a manner that the shaft is rocked, first counter-clockwise and then clockwise, about 90° during each operation of the machine.

2. Actuation of registers generally

Actuation of the registers is controlled by type bars 3 (Figure 3) mounted for vertical movement. The lower ends of the type bars are each provided with a slotted arm 15, embracing a stud 16 on the forward ends of levers 17 pivoted on a rod 18. Strong springs 19 are attached to levers 17 and to the machine frame, and tend to rotate the levers clockwise. The levers are normally restrained against such movement by their forward arms bearing against a rod 20 extending between two spaced, identical cam levers 21 pivoted on rod 18. These cam levers, in turn, are restrained by resting against rolls 22 on similar spaced arms 23, secured to actuating shaft 13, the shaft being normally restrained against movement as disclosed in my application Serial No. 581,800, making the above described mechanism normally held in the position shown in Figure 3.

The rear end of each lever is provided with a recess 24 in which lies a stud 25, there being an increment of lost motion between the parts. Studs 25 are secured to levers 26, also pivoted on rod 18. Springs 27 extend between lower arms of levers 26 and the rear arms of levers 17. This spring tension causes studs 25 to be urged toward the upper ends of recesses 24. Studs 28 are secured to the rear end of levers 26 and lie within slots of the lower ends of vertically movable racks 29. The racks are normally held against movement, upward from the position shown in Figure 3, by bell cranks 30 of the transfer mechanism. As explained in my application Serial No. 581,800, when a transfer occurs between two denominational orders, the rack 29 affected is released for an additional step of movement, which causes the rack to be raised to a position where a shoulder 31 thereon contacts a guide bar 32, and where stud 25 lies in the upper end of recess 24. However, since the transfer mechanism is identical with that explained in the Sundstrand application Serial No. 581,800, it is only necessary to note here that the transfer mechanism provided for item counting wheels 11 (Figure 5) is independent of that associated with the amount accumulating wheels 10 of each register.

When the machine is operated, roller 22 moves counter-clockwise about shaft 13, allowing strong springs 19 to raise type bars 3 and lower racks 29. The amount of movement imparted to the type bars and the racks is controlled by the amount entered in the keyboard in a manner to be later described. Continued movement of roller 22 raises cam lever 21, without an accompanying movement of levers 17 and racks 29, after the type bars are arrested. During the first portion of the return movement of roller 22, it rides along a dwell portion of cam levers 21 to give the selected register an opportunity to become engaged with racks 29 before they return to their raised positions. The ensuing return movement of the racks during the return of rollers 22 rotates wheels 10 of the engaged register to add thereon the amount indexed.

The lower group of registers are actuated by mechanism identical with that described in the foregoing, the corresponding parts being designated by like reference numerals with the letter a appended thereto. A plurality of extensions 33, one for each denominational order, are connected to type bars 3 at 34, the lower ends of the extensions each being provided with a slotted arm 15a embracing studs 16a on levers 17a that are similar to levers 17. A separate set of transfer elements designated generally at 30a and operating similarly to those for the upper registers, is provided for the lower registers. The transfer mechanism of racks 29a associated with item count wheels 11 operates independently of the transfer mechanism of racks 29a associated with the amount accumulating wheels 10.

The mechanism for controlling such functions as selection of the registers, selection of the upper or lower group, engagement of the registers, non-addition, total and sub-total taking is fully disclosed in application Serial No. 88,092.

3. Amount indexing and printing by whole number keys

Figure 3:
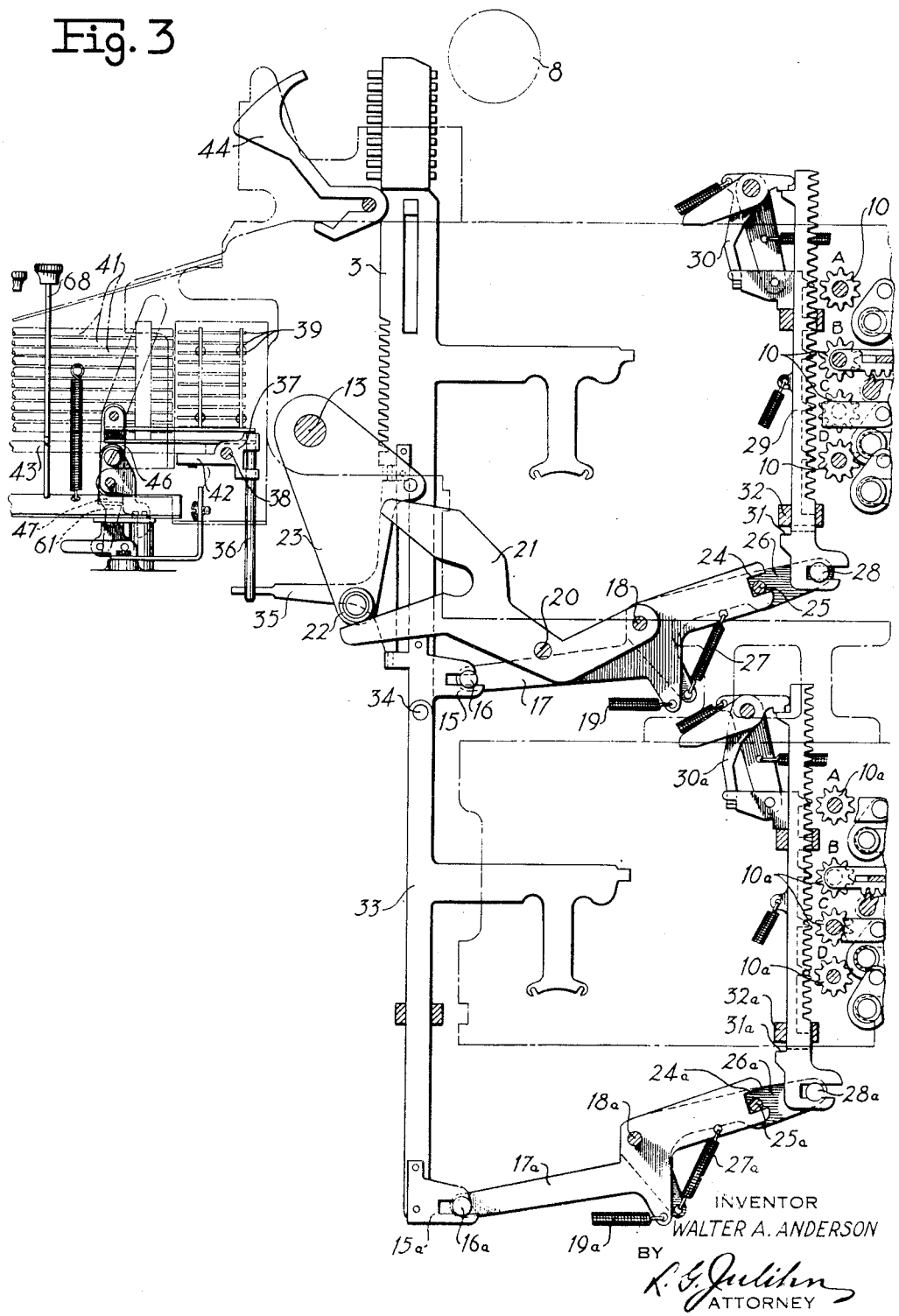

The group of type bars 3 associated with the whole number keys 1 (Figure 5) are provided with forwardly extending arms 35 pivoted to the lower ends of the type bars (Figure 3). The forward ends of these arms 35 carry upstanding pins 36 arranged to be guided for vertical movement in openings in a transversely movable slide 37, mounted on a stationary rod 38. Pins 36 lie just behind a series of stops 39 and are normally positioned to the left thereof, as shown in Figure 5. The stops 39 are set, i. e., moved into the path of the pins 36, by depression of the amount keys 40. Depression of the keys 40 thrusts rods 41 (Figure 7) rearwardly, setting the stops. The slide 37 is provided with a forwardly extending projection 42 having a pin and slot connection with a swinging bracket 43 (see also Figure 5) in which the rods 41 are slidably mounted. Through an escapement mechanism (not shown) associated with the slide 37, bracket 43, and keys 40, indexing of a number by these keys, as above described, allows slide 37, bracket 43 and pins 36 to move step by step toward the right, as viewed in Figure 5, one step for each digit indexed, and thereby move pins 36 under the rear ends of the stops 39 set by the amount keys. Hence, as the machine is cycled, and the type bars 3 (Figure 3) rise, pins 36 strike against the differentially set stops 39, in which position corresponding type characters in the upper ends of the type bars are brought into printing alignment with the platen 8. Shortly after this, impression hammers 44 are operated to print the amount. During the last half of the cycle, type bars 3 are restored as described in the foregoing, and rods 41, pins 36 and stops 39 are restored to their normal positions shown in Figure 5. Any type bars 3 not used in printing this number are prevented from rising by a detent plate 45 (see also Figure 4). The plate 45 is guided for forward movement in the machine frame, the forward end thereof being pivoted to an upstanding arm 46 of a bail 47 pivoted on a stationary transverse rod 48. A spring 49, secured to the opposite upstanding arm 50 of bail 47, tensions the bail and plate 45 rearwardly so that a shoulder 51 on the plate abuts a portion (not shown) of the machine frame. In this position, the rear edge of the plate overlies such of the pins 36 as were not moved from under the plate when the number was indexed, and thereby prevents the upward movement of the actuators connected with these pins.

In total taking operations, it is necessary to withdraw this plate from above the pins 36 to permit the type bars 3 to rise.

Figure 9:
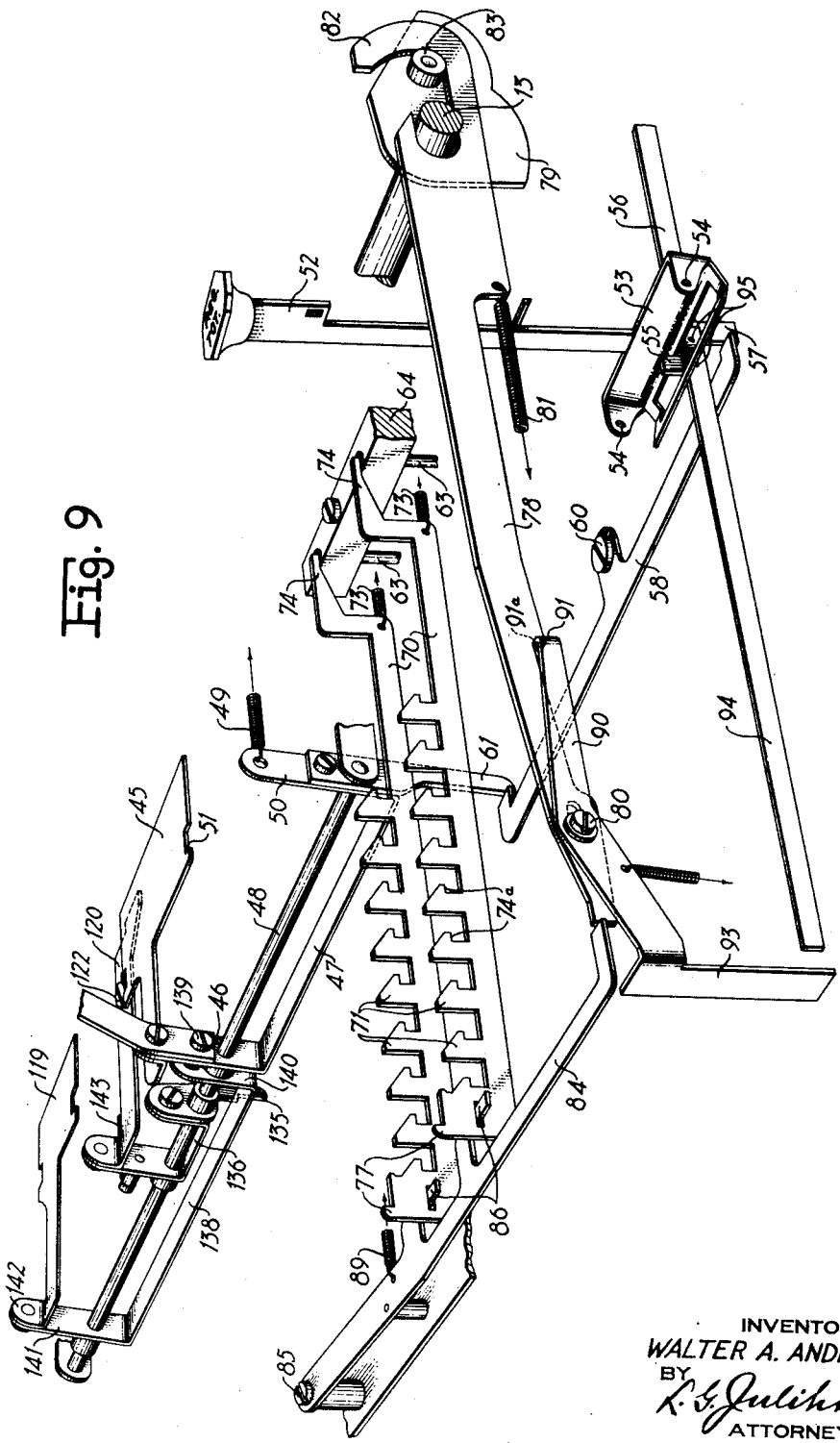

Referring now to Figure 9, the lower end of a register total key 52 rests upon the upper edge of a cradle 53 pivoted as at 54. An upstanding lug 55 of a total control slide 56 lies in front of cradle 53. A depending lug 57 formed on the lower edge of slide 56 lies in back of one end of a lever 58 pivoted at 60 and having its opposite end resting against a downwardly extending projection 61 secured to the arm 50 of bail 47. Hence, depression of total key 52 withdraws plate 45 from above pins 36 against the tension of spring 49.

For a more detailed understanding of this indexing and printing mechanism, reference should be made to application Serial No. 581,800.

4. Amount indexing and printing by decimal keys

A pair of type bars 3 immediately to the right of the whole number type bars (Figure 5) are arranged to print digits to the right of the decimal point, i. e., decimal fractions. These type bars are connected with the decimal keys 2 by forwardly extending arms 62, similar to arms 35, pivoted to the lower ends thereof. The forward ends of arms 62 carry upstanding pins 63, similar to pins 36, that are guided for vertical movement in openings in a stationary guide bar 64 secured on the machine frame. Guide bar 64 is positioned rearwardly of the decimal keys and pins 63 lie just behind and below a series of slides 65 (Figure 6), the right ends of which serve as stops. Slides 65 are arranged to be set, i. e., moved into the path of pins 63 by depression of keys 68 that control the indexing of the digits "1" to "9". Keys 68 are suitably guided for vertical movement in a frame 67, and each key has a slot and lug connection with a bell crank 66 pivoted on the side wall of the frame. Slides 65 are pivoted at their left ends to bell cranks 66, and springs 69 mounted between shoulders on the slides and a flange on frame 67 normally tension the slides toward the left, and the corresponding keys toward raised position as shown in Figure 6. A locking zero stop slide 70 is slidably supported in frame 67 beneath slides 65 and serves to stop the upward rise of pins 63 and their associated type bars 3 in position for printing zeros when no digit "1" to "9" is indexed. This slide has a series of upstanding bevelled lugs 71 contacting bevelled surfaces of lugs 72 formed on each of the keys 68. Springs 73, connected between the right ends of slides 70 and frame 67, normally tension the slides toward the right as viewed in Figure 6, so that extensions 74 thereon normally overlie pins 63. Clearance between the upper ends of pins 63 and the lower edge of extensions 74 provides for the upward movement of the type bars to zero printing position.

Depression of a key 68 causes its lug 72 to cam the associated slide 70 toward the left, whereby extension 74 is withdrawn from the path of pin 63 as slide 65 corresponding to the digit indexed moves to the right into the path of pin 63. The parts are locked in this position by lug 72 of the depressed key engaging a shoulder 74a provided on the corresponding lug 71.

When the machine is then operated, the type bars 3 rise, and pins 63 strike the ends of the differentially set slides 65, in which position corresponding type characters on the upper ends of the type bars are brought into printing alignment with the platen 8. As was described in connection with whole number printing, impression hammers 44 (Figure 3) are tripped shortly after this to print the amount.

During the last half of the cycle, type bars 3 and pins 63 are restored as described in the foregoing. A plate 75 (Figure 6) extending transversely of the machine is pivoted as at 76 on frame 67. The lower edge of this plate lies immediately behind upstanding lugs 77 formed on the left ends of slides 70. By this arrangement, a slight clockwise movement of plate 75 about its upper edge (as viewed in Figure 6) at the end of each machine cycle pulls slides 70 to the left sufficiently to release any depressed key 68 and its associated slide 65. The key restoring mechanism is identical with that disclosed in detail in application Serial No. 581,800.

It is essential that slides 70 be withdrawn from the path of pins 63 for total taking operations, so that their associated type bars can rise to print under control of the decimal fraction wheels of the selected register. This withdrawal of slides 70 is controlled by mechanism associated with the register total key (Figures 9 and 10). The mechanism includes a link 78 supported for sliding movement on rock shaft 13, and on a stud 80 secured in the machine frame. A strong spring 81 normally tensions the link forwardly, causing an upstanding arm 82 thereon to bear against a roller 83 on a plate 79 secured to shaft 13. A lever 84 pivoted on a stud 85, secured to the machine frame, is provided with hooks 86 that engage slots in the forward ends of slides 70. The free end of lever 84 lies directly in front of the forward end of link 78, and is tensioned toward the link by a spring 89 connected between the lever and the machine frame. A spring tensioned latch 90 pivoted on stud 80 has a flange 91 arranged to engage a shoulder 91a on the lower edge of link 78. Latch 90 is provided with a depending arm 93 that lies directly in front of an extension 94 secured as at 95 (Figure 10) to total control slide 56.

Depression of total key 52 to condition the machine for total taking moves slide 56 forwardly, as before described, causing extension 94 to strike arm 93 of latch 90 and rock the latch clockwise about stud 80 a distance sufficient to remove flange 91 from engagement with shoulder 91a.

Total key 52 is held depressed by a lock slide (not shown) similar to the lock slides 70 associated with the decimal keys. This holds the parts in the position above described, with link 78 free to move forward under the control of roller 83. When motor bar 14 is then depressed, initiating the total taking cycle, shaft 13 rocks counter-clockwise, moving roller 83 away from arm 82 and thereby permitting link 78 and lever 84 to move forward under the tension of spring 81, this spring being superior to spring 89. This withdraws slides 70 from the path of pins 63 during the first part of the cycle. The decimal type bars are now free to rise differentially under the control of the decimal fraction wheels of the selected register. After the type bars are raised and the impression hammers 44 operated to print the total, rock shaft 13 and roller 83 swing clockwise, roller 83 moving link 78 back to its normal position shown in Figure 9 by striking arm 82. At the completion of the cycle, key 52 is restored in the usual manner, permitting flange 91 to again engage shoulder 91a of link 78 to prevent the link from coming forward during ensuing accumulating operations. During the restoring movement of link 78, slides 70 are returned by springs 73 to their normal position where extensions 74 overlie pins 63.

Slide 56 may be actuated under the control of the traveling paper carriage 4 to automatically condition the machine for total taking operations.

Referring to Figure 10, the rear end of the slide rests against a depending arm of a lever 102 pivoted on a stationary rod 103. Lever 102 is arranged to be actuated by a rod 104, resting thereon and guided for vertical movement in the machine frame. Rod 104 is arranged to be depressed by a control lug placed in magazines, such as 7, supported on the control plate 6 of the carriage in columns where register totals are to be taken. As the carriage moves into these columns, a lug, such as 105, depresses rod 104 and rocks lever 102 clockwise about rod 103 to thrust slide 56 forwardly to condition the total taking mechanism.

5. *Carriage controlled means for non-printing ".00" in whole number amount columns*

As it is undesirable to have ".00" printed in those columns of the work sheet allocated to the printing of amounts not containing decimal fractions, the following means is provided to suppress this printing.

A non-print plate 106 (Figure 10) is pivoted on a stationary rod 107, and has a downwardly turned flange 108 along its rear edge of sufficient width to engage the impression hammers 44 associated with the decimal fraction type bars. A link 109 is pivoted at its upper end to the plate, extends rearwardly and engages a depending arm 110 of a lever 111 pivoted on rod 103. A rod 112 similar to rod 104 rests upon the horizontal arm of this lever and is guided for vertical movement in the machine frame. Rod 112 is arranged to be depressed by lugs such as 113 placed in magazines 7 for the columns in which whole numbers are printed. A spring 114 secured to lever 109 and to the machine frame normally tensions the link rearwardly and maintains the associated parts in the position shown in Figure 10. When the carriage tabulates to the columns where a whole number is to be printed, lugs 113 depress rod 112, rock lever 111 clockwise, and thrust link 109 forward against the tension of spring 114. This forward movement of link 109 rocks plate 106 downwardly and thereby lowers flange 108 into the path of hammers 44 associated with the decimal fraction type bars 3 to prevent the hammers from striking the ".00" type when either an item or a total is printed in these columns.

6. *Item counting mechanism and control thereof by whole number keys*

As before stated, each register is provided with three adding wheels 11 (Figure 5) for counting the number of items indexed on the amount indexing keys 1 and 2, for accumulation in the selected register. Wheels 11 are actuated by racks 29 associated with item count type bars 3 located to the left of the whole number type bars. These type bars have forwardly extending arms 115, similar to arms 35, pivoted to the lower ends thereof (see also Figure 4). The forward end of arm 115 connected with the units item count type bar carries an upstanding pin 116 guided for vertical movement in an opening in slide 37 to the left of pins 36. The forward ends of arms 115 associated with the tens and hundreds orders of the item count type bars carry upstanding pins 117 arranged to be guided for vertical movement in openings in a stationary guide 118 supported on rod 38 to the left of slide 37. A detent plate 119, similar to detent plate 45, normally overlies pins 117 to prevent the upward movement of their associated type bars beyond zero printing position during item entering operations.

The pin 116 is shorter than pins 36, 63 and 117, and lies below a detent 120 that is mounted for forward and rearward sliding movement below detent plate 45, in a recess 121 provided in slide 37 as shown in Figure 4. A screw 122, passing through a slot in detent 120 and secured in the machine frame, serves to guide the detent and secure it within recess 121. The distance between the upper end of pin 116 and the under side of detent 120 (Figure 8) is sufficient to permit the units item count type bar to rise to zero printing position during each cycle of the machine.

When, however, an amount is indexed by the whole number keys 1, indexing of the first digit thereof causes slide 37 to move one step toward the right, as described in the foregoing. This step of movement withdraws pin 116 from its position beneath detent 120. It still lies under detent plate 45, however. Now, upon cycling the machine to accumulate the amount indexed, pin 116 rises until arrested by plate 45. This amount of movement is sufficient to allow the units item count type bar to rise to its "1" position, and its associated rack 29 to descend a distance of one tooth. Following the release of the impression hammers 44 to print the count "1" and the amount of the item, the selected register is engaged, and, when the rack 29 ascends during the latter half of the cycle as type bars 3 are restored, "1" is added in the units order wheel of the item count wheels 11. Transfer mechanism identical with that shown in Figure 3 is provided for the item count wheels, so that when a transfer occurs between two denominational orders in item counting, the rack 29 affected is released to impart an additional step of movement to the wheel 11 of the next highest order.

7. *Control of item count by decimal keys*

Mechanism is provided under the control of the decimal keys 2 for withdrawing detent 120 from over pin 116 to effect an item count of the amounts that do not involve whole numbers, but which are indexed by the decimal keys 2 alone. This mechanism includes a plate 124 (Figures 4 and 8) pivoted on screws 125 along its right edge and lying directly beneath the lower ends of the key stems 68 of decimal keys 2. A pair of springs 126 (Figures 4 and 5), connected between the left edge of the plate and the machine frame, normally tension the plate upwardly, so that its upper surface rests against the lower ends of the left row of decimal keys 2, as shown in Figure 8. A slide 127 (see also Figure 4), lying under bail 47, is arranged for transverse sliding movement upon screws 128 passing through slots therein and secured in the machine frame. Slide 127 carries an upstanding projection 129 having a beveled edge 130 at its upper end arranged to bear against the left edge of plate 124 under the tension of a spring 131 connected between slide 127 and the machine frame. The left end of slide 127 is provided with a pin 132 embraced by a slot provided in one arm of a bell crank 133 pivoted on a screw 134 secured in the machine frame. The opposite end of bell crank 133 rests against a depending lug 135 pivoted on rod 48 and secured at its upper end to an arm of a bail 136 also pivoted on rod 48. The opposite arm of bail 136 is pivoted at 137 to the rear end of detent 120. A spring 143, connected between the arm and the machine frame, normally tensions the bail clockwise about rod 48 so that lug 135 rests against bell crank 133 and detent 120 overlies pin 116.

By this construction, depression of any decimal key 2 rocks plate 124 downwardly against the tension of springs 126 and cams slide 127 toward the left. This movement rotates bell crank 133 clockwise about pivot 134, swings bail 136 counter-clockwise about rod 48, against the tension of spring 143, and withdraws detent 120 from above pin 116. Pin 116 is now free to rise one step, as explained above, to enter "1" in the units order wheel of the item counting wheels 11.

Lock slides 70 hold the decimal keys depressed and the associated train of parts in the positions above described until near the end of the machine cycle, at which time restoring plate 75 (Figure 6) is actuated to allow the depressed decimal keys 2, plate 124, slide 127, bell crank 133, bail 136 and detent 120 to return to their normal positions shown in Figure 4.

It is necessary that detent 120 and detent plate 119 be withdrawn from above the pins 116 and 117 simultaneously with the withdrawal of detent plate 45 from pins 36 during total taking operations, in order that the item count type bars may rise to print a total.

To provide for this, a bail 138 (Figures 8 and 9), similar to bail 47, is pivoted on rod 48 adjacent bail 47, and is connected for movement therewith by means of a screw 139 (Figures 4 and 8) passing through arm 46 of bail 47 and secured in an upstanding arm 140 of bail 138 (Figure 8). The opposite upstanding arm 141 of bail 138 is pivoted at 142 to a forward extension of detent plate 119. The base of bail 138 lies immediately in front of lug 135 fixed on bail 136. Hence, depression of total key 52 moves not only bail 47 and plate 45, but through screw 139 moves bail 138, plate 119, and detent 120. This permits a total to be printed from the item counting wheels 11 as well as from the amount wheels 10.

8. *Illustration of printed items and totals*

In Figure 11, the number 1 on the top line represents the item count, and the number 2512 represents a whole number item. The numbers on the second line show the printing of a total taken from one of the registers used for accumulation of whole number amounts, the number 27 representing the number of items that have been entered in the register and which have been accumulated to give the total 254368.

The third line represents an item having a decimal fraction. The numbers on the fourth line show the printing of a total taken from one of the registers used for accumulation of amounts having decimal fractions, the number 37 representing the number of items entered in the register, and which have been accumulated to give the total 452651.29.

While the form of mechanism herein shown and described is admirably adapted to fulfill the objects primarily stated, it is to be understood that it is not intended to confine the invention to the one form of embodiment therein disclosed, for it is susceptible of embodiment in various forms all coming within the scope of the claims which follow.

What is claimed is:

1. In a machine of the class described, a totalizer, an item counter, two sets of keys for entering amounts in the totalizer, means to advance the item counter, and means to control the operation of the advancing means, the controlling means including two cooperating parts, one part being movable away from the other part under control of the keys of one set, and said other part being movable away from the said one part under control of the keys in the other set.

2. In a machine of the class described, two sets of amount keys, an item counter, a feeling member to control actuation of the counter, a stop member to limit movement of the feeling member, means controlled by the keys of one set to move the feeling member away from the stop member, and means controlled by the keys of the other set to move the stop member away from the feeling member.

3. In an accounting machine adapted for handling decimal amounts, a totalizer, ten keys, indexing mechanism controlled by the ten keys and associated only with the decimal orders of the totalizer situated to the left of the decimal point in the numbers being entered, for indexing digits in the totalizer to the left of the decimal point, the entry beginning with the digit of highest order, a plurality of rows of other keys, nine in each row, and a separate indexing mechanism controlled by the keys in each row and associated only with the decimal orders of the totalizer situated to the right of the decimal point in the numbers being entered, for indexing digits in the totalizer to the right of the decimal point.

WALTER A. ANDERSON.